US008760026B2

(12) United States Patent
Suzuki et al.

(10) Patent No.: US 8,760,026 B2
(45) Date of Patent: Jun. 24, 2014

(54) ROTOR WITH V-SHAPED PERMANENT MAGNET ARRANGEMENT, ROTATING ELECTRIC MACHINE, VEHICLE, ELEVATOR, FLUID MACHINE, AND PROCESSING MACHINE

(75) Inventors: Takeo Suzuki, Fukuoka (JP); Akihiko Maemura, Fukuoka (JP); Yosuke Kawazoe, Fukuoka (JP); Yuto Fukuma, Fukuoka (JP); Kenji Tomohara, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 56 days.

(21) Appl. No.: 13/409,007

(22) Filed: Feb. 29, 2012

(65) Prior Publication Data

US 2012/0212095 A1 Aug. 23, 2012

Related U.S. Application Data

(63) Continuation of application No. PCT/JP2010/064136, filed on Aug. 23, 2010.

(30) Foreign Application Priority Data

Aug. 31, 2009 (JP) ............................ P. 2009-200795

(51) Int. Cl.
*H02K 21/12* (2006.01)
*H02K 1/27* (2006.01)

(52) U.S. Cl.
USPC ............ 310/156.53; 310/156.25; 310/156.45; 310/156.46

(58) Field of Classification Search
USPC ............ 310/156.01, 156.08, 156.45, 156.46, 310/156.53, 156.56
See application file for complete search history.

(56) References Cited

U.S. PATENT DOCUMENTS

2008/0231135 A1* 9/2008 Suzuki et al. ............ 310/156.53

FOREIGN PATENT DOCUMENTS

| | | |
|---|---|---|
| CN | 101272066 | 9/2008 |
| JP | 2005-218228 | 8/2005 |
| JP | 2008-236890 | 10/2008 |

OTHER PUBLICATIONS

International Search Report for corresponding International Application No. PCT/JP2010/064136, Nov. 9, 2010.

Written Opinion for corresponding International Application No. PCT/JP2010/064136, Nov. 9, 2010.

Chinese Office Action for corresponding CN Application No. 201080038746.1, Mar. 5, 2014.

* cited by examiner

*Primary Examiner* — Tran Nguyen
*Assistant Examiner* — Jose Gonzalez Quinone
(74) *Attorney, Agent, or Firm* — Ditthavong Mori & Steiner, P.C.

(57) ABSTRACT

A rotor includes first and second permanent magnets provided in each magnetic pole inside a rotor core. The rotor is configured such that when a first end of the first permanent magnet located on the outer circumferential side of the rotor core and the second permanent magnet side is located at a position that faces a first end in the circumferential direction of one of teeth of a stator, a second end of the first permanent magnet located on the axis of rotation side of the rotor core and the second permanent magnet side is located at a position that faces a second end in the circumferential direction of the tooth that faces the first end of the first permanent magnet.

17 Claims, 5 Drawing Sheets

ROTOR WITH V-SHAPED PERMANENT MAGNET ARRANGEMENT, ROTATING ELECTRIC MACHINE, VEHICLE, ELEVATOR, FLUID MACHINE, AND PROCESSING MACHINE

CROSS-REFERENCE TO RELATED APPLICATIONS

The present application is a continuation application of PCT/JP2010/064136, filed Aug. 23, 2010, which claims priority to Japanese Patent Application No. 2009-200795, filed Aug. 31, 2009. The contents of these applications are incorporated herein by reference in their entirety.

BACKGROUND OF THE INVENTION

1. Field of the Invention

The present invention relates to a rotor, a rotating electric machine, a vehicle, an elevator, a fluid machine, and a processing machine.

2. Discussion of the Background

There has been proposed a technology that improves the efficiency of a permanent magnet type synchronous rotating electric machine (see, for example, Japanese Unexamined Patent Application Publication No. 2008-236890). This technology uses a synchronous motor whose rotor contains permanent magnets, what is called an interior permanent magnet (IPM) motor. In this technology, two permanent magnets forming a magnetic pole are disposed in a V-shape, the permanent magnets are disposed unsymmetrically with respect to a center line that bisects the pole pitch angle, the permanent magnets have different widths in the longitudinal direction, and thereby the efficiency is improved.

SUMMARY OF THE INVENTION

According to one aspect of the present invention, a rotor includes a rotor core the outer circumference of which faces teeth of a stator of a rotating electric machine, and first and second permanent magnets provided in each magnetic pole inside the rotor core. In the cross-section of the rotor core perpendicular to the axis of rotation of the rotor, the first and second permanent magnets forming a magnetic pole are disposed such that a distance between the first and second permanent magnets increases toward the outer circumference of the rotor core, and when a first end of the first permanent magnet located on the outer circumferential side of the rotor core and the second permanent magnet side is located at a position that faces a first end in the circumferential direction of one of the teeth, a second end of the first permanent magnet located on the axis of rotation side of the rotor core and the second permanent magnet side is located at a position that faces a second end in the circumferential direction of the tooth that faces the first end of the first permanent magnet.

According to another aspect of the present invention, a rotating electric machine includes a stator having teeth, and a rotor provided so as to face the teeth. The rotor includes a rotor core the outer circumference of which faces the teeth, and first and second permanent magnets provided in each magnetic pole inside the rotor core. In the cross-section of the rotor core perpendicular to the axis of rotation of the rotor, the first and second permanent magnets forming a magnetic pole are disposed such that a distance between the first and second permanent magnets increases toward the outer circumference of the rotor core, and when a first end of the first permanent magnet located on the outer circumferential side of the rotor core and the second permanent magnet side is located at a position that faces a first end in the circumferential direction of one of the teeth, a second end of the first permanent magnet located on the axis of rotation side of the rotor core and the second permanent magnet side is located at a position that faces a second end in the circumferential direction of the tooth that faces the first end of the first permanent magnet.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
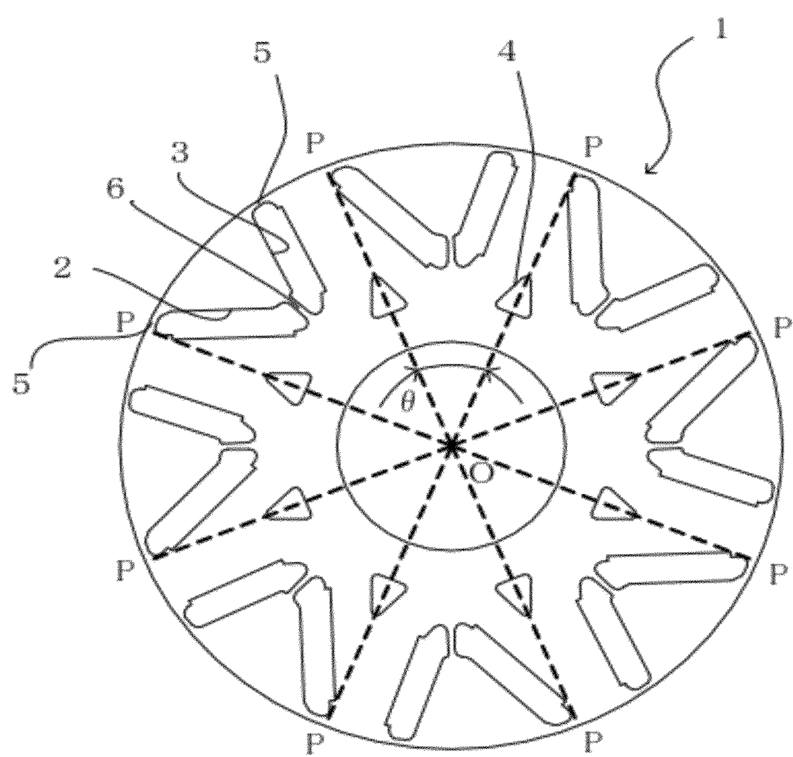
FIG. 1 is a front view of an electromagnetic steel plate forming member stamped out to form a rotor core according to an embodiment of the present invention.

Embodiments will now be described with reference to the accompanying drawings, wherein like reference numerals designate corresponding or identical elements throughout the various drawings.

Embodiment

With reference to FIG. 1, an electromagnetic steel plate forming member stamped out to form a rotor core of a rotor according to this embodiment will be described. FIG. 1 is a front view of an electromagnetic steel plate forming member stamped out to form a rotor core of a rotor according to this embodiment. In FIG. 1, ○ is the axis of rotation of the rotor and the center of rotation of the rotor. OP is a pole separating line that separates poles adjacent to each other in the circumferential direction of the rotor core. θ is the pole pitch angle and the angle between pole separating lines adjacent to each other in the circumferential direction. In this embodiment, as an example, the number of magnetic poles of the rotor is eight. In this case, as shown in FIG. 1, the number of pole separating lines OP is eight, and the pole pitch angle θ is 45 degrees.

In FIG. 1, the electromagnetic steel plate forming member 1 is a thin disk-shaped electromagnetic steel plate. In the electromagnetic steel plate forming member 1, in each magnetic pole, magnet holes 2 and 3 into which permanent magnets are inserted are formed. The magnet holes 2 and 3 form a V-shape whose vertex faces the center O of rotation. The shapes of the magnet holes 2 and 3 are elongate. In the example of FIG. 1, the shapes of the magnet holes 2 and 3 are approximately elliptical. The width in the longitudinal direction of the magnet hole 3 is smaller than the width in the longitudinal direction of the magnet hole 2. A cavity portion 4 is formed on each pole separating line OP. An outer bridge 5 is formed between the end of each of the magnet holes 2 and 3 on the opposite side from the vertex of the V-shape (on the outer circumferential side of the electromagnetic steel plate forming member 1) and the outer circumference of the electromagnetic steel plate forming member 1. A center bridge 6 that separates the magnet holes 2 and 3 is formed between the end of the magnet hole 2 close to the vertex of the V-shape and the end of the magnet hole 3 close to the vertex of the V-shape. By stacking a plurality of such electromagnetic steel plate forming members 1 into the form of a block, a rotor core is made.

Figure 2:
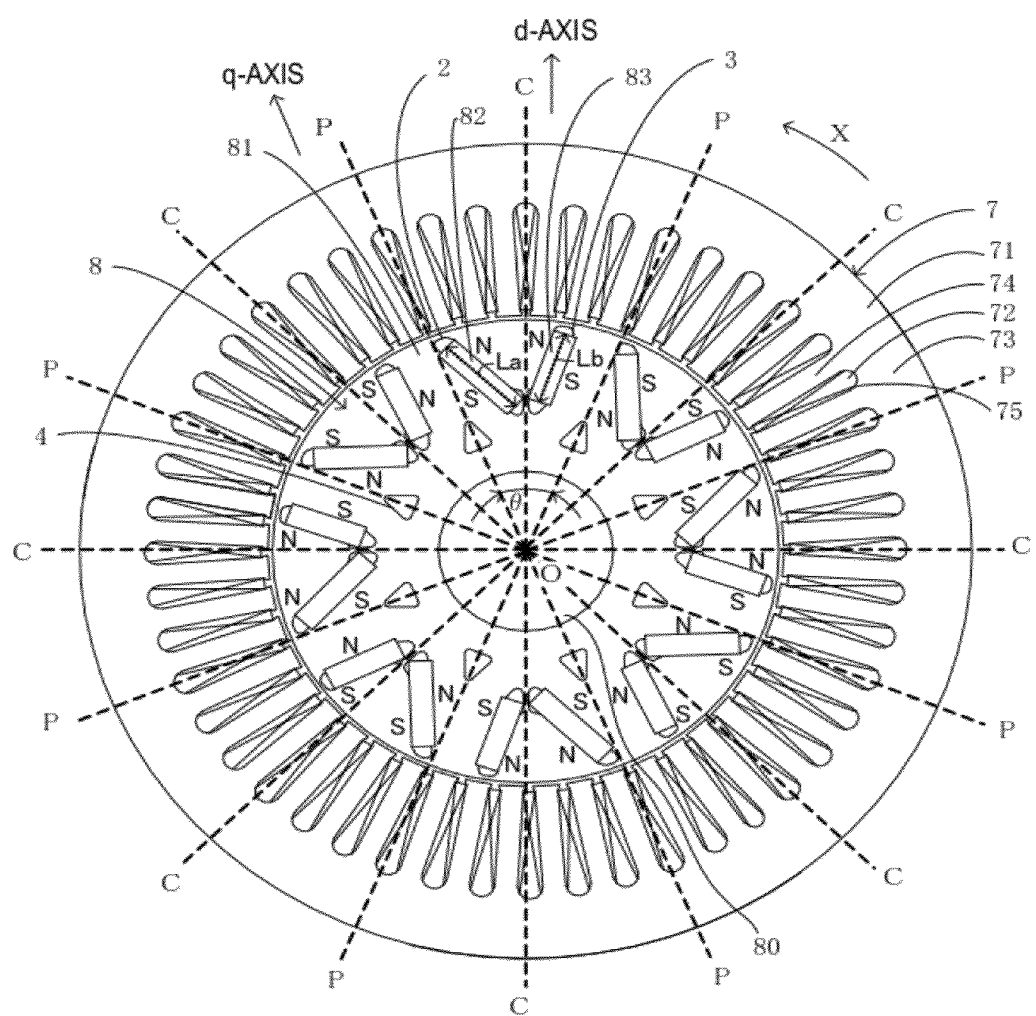
FIG. 2 is a front sectional view of a permanent magnet type synchronous rotating electric machine according to an embodiment of the present invention.

Next, with reference to FIG. 2, a permanent magnet type synchronous rotating electric machine having a rotor according to this embodiment will be described. FIG. 2 is a front sectional view of a permanent magnet type synchronous rotating electric machine according to this embodiment. FIG. 2 shows a cross-section of the permanent magnet type synchronous rotating electric machine taken from a direction perpendicular to the axis O of rotation of the rotor. In FIG. 2, OC is a center line that bisects the angle between pole separating lines OP adjacent to each other in the circumferential direction (that is to say, bisects the pole pitch angle θ).

In FIG. 2, the permanent magnet type synchronous rotating electric machine has a stator 7 and a rotor 8. The stator 7 has a stator core 71 and windings 72. The stator core 71 includes a yoke 73 and teeth 74. The teeth 74 are formed on the inner circumferential side of the yoke 73. Slots 75 are formed between the teeth 74, and the windings 72 are placed in the slots 75. In this embodiment, the number of poles of the rotor 8 is eight, and the number of the slots 75 of the stator 7 is 48, and therefore the pitch width of a tooth 74 is 7.5 mechanical degrees. The current phase difference between the windings 72 is 120 electrical degrees (30 mechanical degrees), and therefore every time the current phase changes, the rotor 8 rotates an angle corresponding to four teeth 74.

The outer circumference of the rotor 8 faces the teeth 74 of the stator 7, and the rotor 8 rotates mainly in the X direction. The rotor 8 has a shaft 80, a rotor core 81, and permanent magnets 82 and 83. The rotor core 81 is formed by the electromagnetic steel plate forming members 1 shown in FIG. 1. The permanent magnets 82 are inserted into the magnet holes 2, and the permanent magnets 83 are inserted into the magnet holes 3. Thus, in each magnetic pole, the permanent magnets 82 and 83 are disposed such that the distance therebetween increases toward the outer circumference of the rotor core 81. In the example of FIG. 2, in each magnetic pole, the permanent magnets 82 and 83 are provided so as to form an approximately V-shape whose vertex faces the center O of rotation of the rotor 8. The number of magnetic poles of the rotor 8 is eight as described above. As shown in FIG. 2, the cross-sectional shapes of the permanent magnets 82 and 83 are rectangular. The longitudinal direction of the permanent magnet 82 is parallel to the part of the V-shape formed by the permanent magnet 82, and the longitudinal direction of the permanent magnet 83 is parallel to the part of the V-shape formed by the permanent magnet 83. The width in the longitudinal direction (the length of the long side) Lb of the permanent magnet 83 is smaller than the width in the longitudinal direction (the length of the long side) La of the permanent magnet 82. In this embodiment, the permanent magnets 82 and 83 are separated by a center line OC. A magnetic pole is formed on the outer circumferential side of the permanent magnets 82 and 83 forming a V-shape, and magnetic poles whose polarities are opposite are arranged alternately in the circumferential direction of the rotor core 81.

Figure 3:
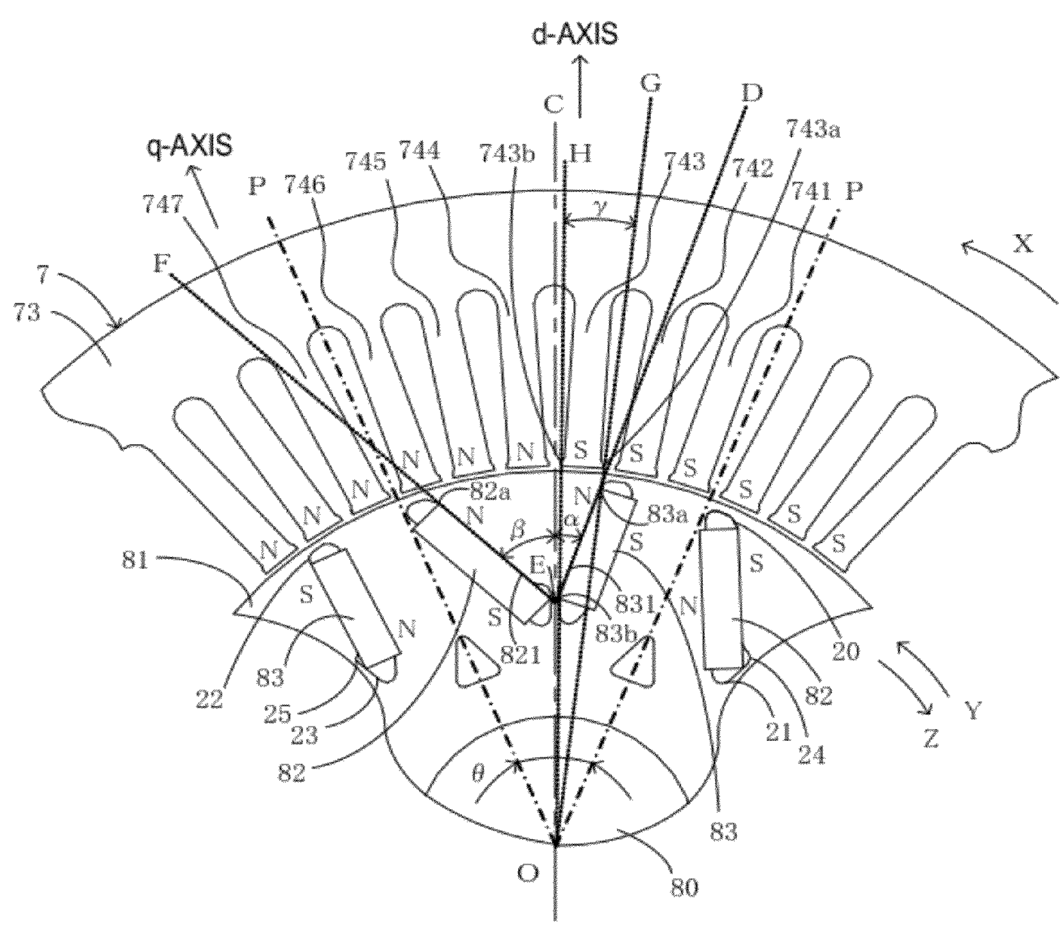
FIG. 3 is an enlarged front sectional view of part of a permanent magnet type synchronous rotating electric machine according to an embodiment of the present invention.

Next, with reference to FIG. 3, the detailed configuration of the rotor 8 will be described. FIG. 3 is an enlarged front sectional view of part of the permanent magnet type synchronous rotating electric machine according to this embodiment. In FIG. 3, the windings 72 shown in FIG. 2 are omitted. In FIG. 3, E denotes the apex of a V-shape and lies on the center line OC. The straight line DE is a straight line parallel to the longitudinal direction of the permanent magnet 83, and the straight line FE is a straight line parallel to the longitudinal direction of the permanent magnet 82. In FIG. 3, for ease of explanation, the teeth 74 are numbered 741 to 747. The Y direction is one of the circumferential directions of the rotor core 81, and the Z direction is a direction opposite to the Y direction. The straight line OG is a straight line passing through the center O of rotation and a first end 83*a* of the permanent magnet 83 located on the outer circumferential side of the rotor core 81 and the Y direction side and is also a straight line passing through the center O of rotation and a first end 743*a* on the Z direction side of the tooth 743. The straight line OH is a straight line passing through the center O of rotation and a second end 83*b* of the permanent magnet 83 located on the inner circumferential side (the axis O of rotation side) of the rotor core 81 and the Y direction side and is also a straight line passing through the center O of rotation and a second end 743*b* on the Y direction side of the tooth 743. The angle γ is the angle between the straight line OG and the straight line OH extending from the center O of rotation. Around the permanent magnets 82 and 83, arc spaces 20 to 25 for preventing short circuit are formed by the magnet holes 2 and 3.

In FIG. 3, of the surface of the rotor 8 in a d-axis, parts where the magnetic force is strong are the surface near a first end 82*a* of the permanent magnet 82 on the outer circumferential side of the rotor core 81 and the Z direction side, the surface near the first end 83*a* of the permanent magnet 83, and the vicinity of the surface on the center line OC. In this embodiment, the permanent magnets 82 and 83 are separated by the center line OC, and therefore the magnetic force in the vicinity of the surface on the center line OC is strong owing to the combination of the magnetic forces of the permanent magnets 82 and 83. FIG. 3 shows a state where the first end 83*a* of the permanent magnet 83 faces the first end 743*a* of the tooth 743 in the radial direction of the rotor core 81.

The long side 831 of the permanent magnet 83 is inclined with respect to the center line OC in the Z direction at a first angle. The long side 821 of the permanent magnet 82 is inclined with respect to the center line OC in the Y direction at a second angle. The second angle is larger than the first angle. In the example of FIG. 3, at the vertex E of the V-shape, the permanent magnet 83 is inclined to the center line OC in the Z direction at an angle α, and the permanent magnet 82 is inclined to the center line OC in the Y direction at an angle β larger than the angle α. The permanent magnet 83 is disposed such that when the first end 83*a* of the permanent magnet 83 faces the first end 743*a* of the tooth 743 in the radial direction of the rotor core 81, the second end 83*b* of the permanent magnet 83 faces the second end 743*b* of the tooth 743 in the radial direction of the rotor core 81. In other words, if for example, the straight line passing through the first end 83*a* of the permanent magnet 83 and the center O of rotation is referred to as a first straight line, the straight line passing through the second end 83$b$ of the permanent magnet 83 and the center ○ of rotation is referred to as a second straight line, the straight line passing through the first end 743$a$ of the tooth 743 and the center ○ of rotation is referred to as a third straight line, and the straight line passing through the second end 743$b$ of the tooth 743 and the center ○ of rotation will is referred to as a fourth straight line, then the permanent magnet 83 is disposed such that the angle between the first straight line and the second straight line is the same as the angle between the third straight line and the fourth straight line (angle $\gamma$ in FIG. 3).

Figure 4A:
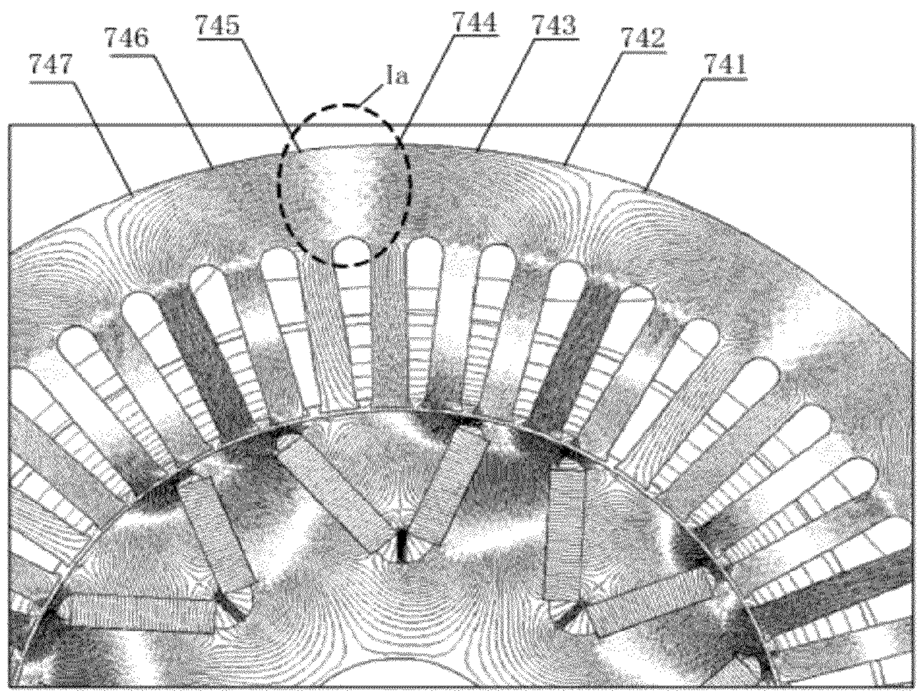
FIG. 4A shows the magnetic field analysis result of a permanent magnet type synchronous rotating electric machine according to an embodiment of the present invention.
Figure 4B:
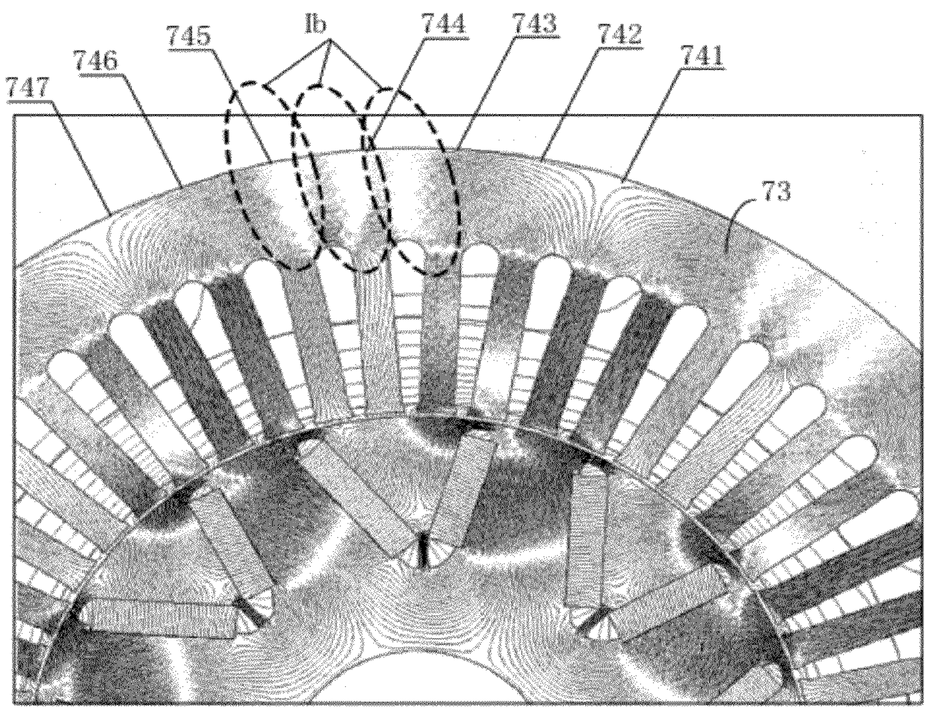
FIG. 4B shows the magnetic field analysis result of a permanent magnet type synchronous rotating electric machine according to a comparative example for comparison to an embodiment of the present invention.

Next, with reference to FIG. 4A and FIG. 4B, the magnetic flux distribution of the permanent magnet type synchronous rotating electric machine according to this embodiment will be described. FIG. 4A shows the magnetic field analysis result of the permanent magnet type synchronous rotating electric machine according to this embodiment shown in FIG. 3. FIG. 4B shows the magnetic field analysis result of a comparative example for comparison to this embodiment. In FIG. 4A and FIG. 4B, for convenience, the lead lines extending from reference numerals 741 to 747 indicate the outer circumferential positions of the teeth 741 to 747.

In the case where the permanent magnet 83 is disposed such that, as shown in FIG. 3, when the first end 83$a$ of the permanent magnet 83 faces the first end 743$a$ of the tooth 743, the second end 83$b$ of the permanent magnet 83 faces the second end 743$b$ of the tooth 743, the magnetic flux distribution of part of the permanent magnet type synchronous rotating electric machine shown in FIG. 3 is as shown in FIG. 4A. It can be seen that, as shown in FIG. 4A, the magnetic flux per magnetic pole passing through the yoke 73 of the stator 7 is distributed within the range from the tooth 742 to the tooth 747. The magnetic flux per magnetic pole is neatly separated from the magnetic flux of the next magnetic pole to the right between the tooth 741 and the tooth 742, and is neatly separated from the magnetic flux of the next magnetic pole to the left between the tooth 747 and the next tooth to the left. That is to say, magnetic flux does not enter the tooth 742 from the next magnetic pole to the right, and magnetic flux does not enter the tooth 747 from the next magnetic pole to the left. It can be seen that a magnetic flux density part Ia where the magnetic flux density is moderate exists in the yoke 73 in a magnetic pole. It can be seen that the place having the highest magnetic flux density in a magnetic pole is the tooth 747.

As shown in FIG. 4A, the gap flux density of the tooth 742 is almost zero owing to the repulsive component inside the permanent magnet 83. For this reason, the magnetic flux for extracting magnet torque due to the windings 72 passes through the tooth 742, the inner circumferential side of the permanent magnet 83, the inner circumferential side of the permanent magnet 82, the tooth 747, and the yoke 73 in this order, and a neat magnetic path is formed.

On the other hand, in the case where the first end 83$a$ of the permanent magnet 83 is disposed further to the right relative to the position of the first end 83$a$ of the permanent magnet 83 in FIG. 3 and under the tooth 742, the magnetic flux distribution of part of the permanent magnet type synchronous rotating electric machine corresponding to FIG. 3 is as shown in FIG. 4B. It can be seen that, as shown in FIG. 4B, the magnetic flux per magnetic pole passing through the yoke 73 of the stator 7 is distributed within the range from the tooth 741 to the tooth 747. Magnetic flux enters the tooth 741 from the next magnetic pole to the right, and magnetic flux enters the tooth 747 from the next magnetic pole to the left. It can be seen that three magnetic flux density parts Ib where the magnetic flux density is moderate exist in the yoke 73 in a magnetic pole. This shows that the iron loss is larger than that of the magnetic flux density part Ia of FIG. 4A. It can be seen that the places having the highest magnetic flux density in a magnetic pole are the tooth 741 and the tooth 747. Since magnetic flux flows in from the neighboring magnetic poles, the magnetic flux density of the two teeth 741 and 747 is higher than that of the tooth 747 having the highest magnetic flux density in FIG. 4A.

As shown in FIG. 4B, the tooth 742 is the south pole, and therefore if the north pole components of the permanent magnets 82 and 83 face the tooth 742 even slightly, although the tooth 743 mainly forms a magnetic path, the tooth 742 also forms part of the magnetic path as an attractive magnetic flux. For this reason, the magnetic flux for extracting magnet torque due to the windings 72 passes through not only the tooth 742 but also part of the tooth 741, the inner circumferential side of the permanent magnet 83, the inner circumferential side of the permanent magnet 82, the tooth 747 and part of the tooth 746, and the yoke 73 in this order, and a complex magnetic path in which the magnetic flux density is locally high is formed.

Although not shown, in the case where the first end 83$a$ of the permanent magnet 83 is disposed further to the right relative to the position of the first end 83$a$ of the permanent magnet 83 in FIG. 4B, the magnetic flux distribution of part of the permanent magnet type synchronous rotating electric machine corresponding to FIG. 3 is the same as in FIG. 4B. In the case where the first end 83$a$ of the permanent magnet 83 is disposed further to the left relative to the position of the first end 83$a$ of the permanent magnet 83 in FIG. 3, more parts where the magnetic flux density is high are generated in the yoke 73 than in FIG. 4A, and the magnetic flux density in the tooth 743 is higher than that in the tooth 747 having the highest magnetic flux density in FIG. 4A.

FIG. 4A and FIG. 4B show that in this embodiment, disposing the permanent magnets 82 and 83 as shown in FIG. 3 can reduce the parts where the magnetic flux density is high in the stator core 71. Thus, compared to the conventional permanent magnet type synchronous rotating electric machine in which the position of the permanent magnet 83 is not particularly defined, iron loss can be effectively reduced, and magnet torque and reluctance torque can be improved. As a result, the efficiency of a permanent magnet type synchronous rotating electric machine can be improved.

Figure 5A:
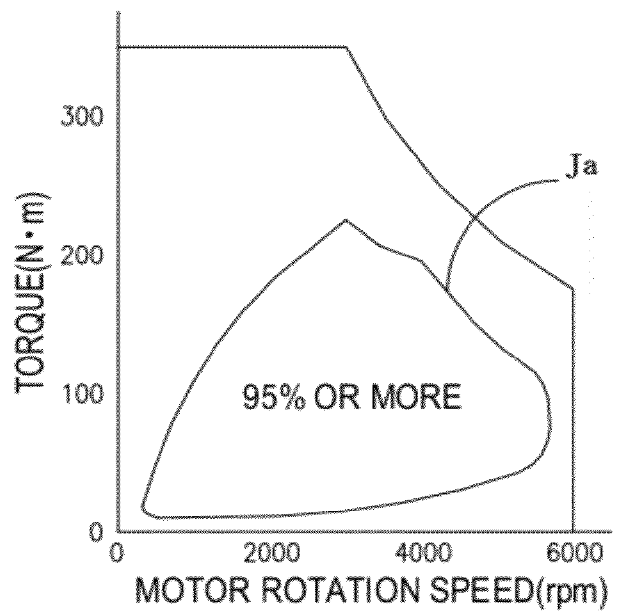
FIG. 5A shows the high efficiency region characteristics of a permanent magnet type synchronous rotating electric machine according to an embodiment of the present invention.
Figure 5B:
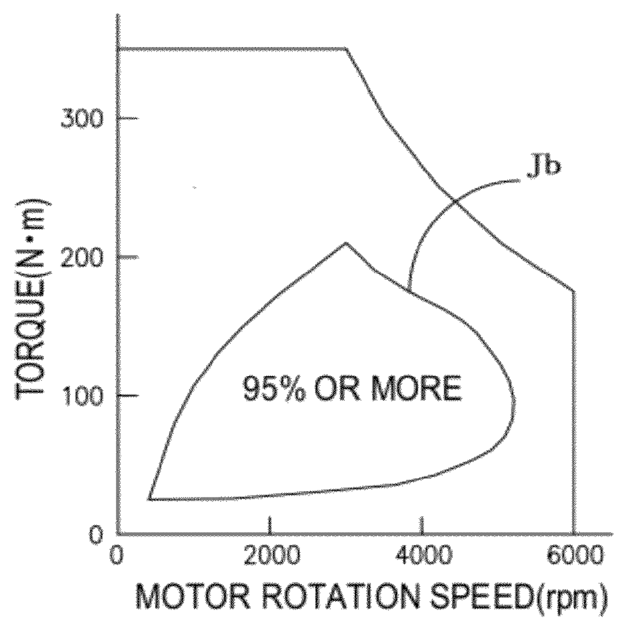
FIG. 5B shows the high efficiency region characteristics of a permanent magnet type synchronous rotating electric machine according to a comparative example for comparison to an embodiment of the present invention.

Next, with reference to FIG. 5A and FIG. 5B, the high efficiency region characteristics of the permanent magnet type synchronous rotating electric machine according to this embodiment will be described. FIG. 5A shows the high efficiency region characteristics of the configuration of this embodiment shown in FIG. 3 and FIG. 4A. FIG. 5B shows the high efficiency region characteristics of the configuration shown in FIG. 4B that is a comparative example for comparison to this embodiment. In FIG. 5A and FIG. 5B, the horizontal axis shows motor rotation speed (rpm), and the vertical axis shows torque (N·m). In FIG. 5A and FIG. 5B, Ja and Jb show regions where the efficiency is 95% or more. Ja is wider than Jb. Although not shown, Ja is wider than the region where the efficiency is 95% or more in the high efficiency region characteristics in the case where the first end 83$a$ of the permanent magnet 83 is disposed further to the left relative to the position of the first end 83$a$ of the permanent magnet 83 in FIG. 3.

FIG. 5A and FIG. 5B show that in this embodiment, disposing the permanent magnets 82 and 83 as shown in FIG. 3 widens the region where the efficiency is 95% or more. Thus, the high efficiency region of a permanent magnet type synchronous rotating electric machine can be widened.

As described above, in this embodiment, the efficiency of a permanent magnet type synchronous rotating electric machine can be improved, and the high efficiency region of a permanent magnet type synchronous rotating electric machine can be widened.

Recently, from the viewpoint of prevention of global warming and resource conservation, it is strongly needed to reduce emissions of carbon dioxide, to reduce the amount of energy consumption, to improve the energy efficiency, and the like. For this reason, the roles played by vehicles such as hybrid cars, fuel-cell cars, and electric cars and industrial power saving machines such as elevators, fluid machines, and processing machines are becoming very important. Permanent magnet type synchronous rotating electric machines used in these vehicles and industrial power saving machines are required to have high efficiency. Under these circumstances, according to this embodiment, the efficiency of a permanent magnet type synchronous rotating electric machine can be improved, and therefore a permanent magnet type synchronous rotating electric machine according to this embodiment is very beneficial.

The above-described permanent magnet type synchronous rotating electric machine according to this embodiment is applicable to motors for driving vehicles and industrial power saving machines, and generators. Examples of vehicles include hybrid cars, fuel-cell cars, and electric cars. Examples of industrial power saving machines include elevators (cranes, winding machines, elevators, multistory parking garages, and the like), fluid machines (compressors and blowers for wind or water power, pumps, and the like), and processing machines (semiconductor manufacturing apparatuses, machine tools, and the like).

Obviously, numerous modifications and variations of the present invention are possible in light of the above teachings. It is therefore to be understood that within the scope of the appended claims, the invention may be practiced otherwise than as specifically described herein.

For example, the cross-sectional shapes of the permanent magnets 82 and 83 are not limited to rectangular shapes and may be other elongate shapes such as elliptical shapes or arc-like shapes.

What is claimed as new and is desired to be secured by Letters Patent of the United States is:

1. A rotor comprising:

a rotor core the outer circumference of which faces teeth of a stator of a rotating electric machine; and first and second permanent magnets provided in each magnetic pole inside the rotor core, wherein in the cross-section of the rotor core perpendicular to the axis of rotation of the rotor, the first and second permanent magnets forming a magnetic pole are disposed such that a distance between the first and second permanent magnets increases toward the outer circumference of the rotor core, and wherein, when a first end of the first permanent magnet located on the outer circumferential side of the rotor core and the second permanent magnet side is located at a position that radially aligns with a first end of a first tooth of the teeth, a second end of the first permanent magnet located on the axis of rotation side of the rotor core and the second permanent magnet side is located at a position that radially aligns with a second end of the first tooth, and a center line defined between the first and second permanent magnets is disposed at a center position between the first tooth and an adjacent tooth in a circumferential direction.

2. The rotor according to claim 1, wherein the first and second permanent magnets that form a magnetic pole are separated by a center line that bisects the angle between pole separating lines adjacent to each other in a circumferential direction of the rotor core, the pole separating lines each separating magnetic poles adjacent to each other in the circumferential direction.

3. The rotor according to claim 2, wherein a first side of the first permanent magnet that forms the distance is inclined to the center line in a first direction of the circumferential direction of the rotor core at a first angle, and a second side of the second permanent magnet that forms the distance is inclined to the center line in a second direction opposite to the first direction at a second angle larger than the first angle.

4. The rotor according to claim 3, wherein the first side is shorter than the second side.

5. The rotor according to claim 3, wherein the first permanent magnet has such an elongate shape that the first side is the longitudinal side, and the second permanent magnet has such an elongate shape that the second side is the longitudinal side.

6. The rotor according to claim 1, wherein the first and second permanent magnets that form a magnetic pole are provided so as to form an approximately V-shape whose vertex faces the center of rotation of the rotor.

7. A rotating electric machine comprising:

a stator having teeth; and a rotor provided so as to face the teeth, wherein the rotor includes a rotor core the outer circumference of which faces the teeth, and first and second permanent magnets provided in each magnetic pole inside the rotor core, and wherein in the cross-section of the rotor core perpendicular to the axis of rotation of the rotor, the first and second permanent magnets forming a magnetic pole are disposed such that a distance between the first and second permanent magnets increases toward the outer circumference of the rotor core, and wherein, when a first end of the first permanent magnet located on the outer circumferential side of the rotor core and the second permanent magnet side is located at a position that radially aligns with a first end of a first tooth of the teeth, a second end of the first permanent magnet located on the axis of rotation side of the rotor core and the second permanent magnet side is located at a position that radially aligns with a second end of the first tooth, and a center line defined between the first and second permanent magnets is disposed at a center position between the first tooth and an adjacent tooth in a circumferential direction.

8. The rotating electric machine according to claim 7, wherein the first and second permanent magnets that form a magnetic pole are provided so as to form an approximately V-shape whose vertex faces the center of rotation of the rotor.

9. A vehicle comprising the rotating electric machine according to claim 7.

10. An elevator comprising the rotating electric machine according to claim 7.

11. A fluid machine comprising the rotating electric machine according to claim 7.

12. A processing machine comprising the rotating electric machine according to claim 7.

13. A rotor comprising:

a rotor core the outer circumference of which faces teeth of a stator of a rotating electric machine; and first and second permanent magnets provided in each magnetic pole inside the rotor core, wherein in the cross-section of the rotor core perpendicular to the axis of rotation of the rotor, the first and second permanent magnets that form a magnetic pole are provided so as to form an approximately V-shape whose vertex faces the center of rotation of the rotor, and wherein, when a first end of the first permanent magnet located on the outer circumferential side of the rotor core and the second permanent magnet side is located at a position that radially aligns with a first end of a first tooth of the teeth, a second end of the first permanent magnet located on the axis of rotation side of the rotor core and the second permanent magnet side is located at a position that radially aligns with a second end of the first tooth, and a center line defined between the first and second permanent magnets is disposed at a center position between the first tooth and an adjacent tooth in a circumferential direction.

14. The rotor according to claim 13, wherein the first and second permanent magnets are separated by a center line that bisects the angle between pole separating lines adjacent to each other in a circumferential direction of the rotor core, the pole separating lines each separating magnetic poles adjacent to each other in the circumferential direction.

15. The rotor according to claim 14, wherein at the vertex of the V-shape, the first permanent magnet is inclined to the center line in a first direction of the circumferential direction at a first angle, and the second permanent magnet is inclined to the center line in a second direction opposite to the first direction at a second angle larger than the first angle.

16. The rotor according to claim 15, wherein the width of the first permanent magnet in a direction parallel to the part of the V-shape formed by the first permanent magnet is smaller than the width of the second permanent magnet in a direction parallel to the part of the V-shape formed by the second permanent magnet.

17. The rotor according to claim 13, wherein in the cross-section of the rotor core perpendicular to the axis of rotation, the first permanent magnet has such an elongate shape that the longitudinal direction is parallel to the part of the V-shape formed by the first permanent magnet, and the second permanent magnet has such an elongate shape that the longitudinal direction is parallel to the part of the V-shape formed by the second permanent magnet.

* * * * *